US009286774B2

(12) United States Patent
Moon et al.

(10) Patent No.: US 9,286,774 B2
(45) Date of Patent: Mar. 15, 2016

(54) TACTILE SENSATION PROVIDING APPARATUS

(71) Applicant: Samsung Electronics Co., Ltd., Suwon-si (KR)

(72) Inventors: Kyung-Won Moon, Yongin-si (KR); Soo Chul Lim, Seoul (KR); Joon Ah Park, Hwaseong-si (KR); Hyun Jeong Lee, Hwaseong-si (KR); Seung Ju Han, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 56 days.

(21) Appl. No.: 14/091,988

(22) Filed: Nov. 27, 2013

(65) Prior Publication Data

US 2014/0253304 A1 Sep. 11, 2014

(30) Foreign Application Priority Data

Mar. 7, 2013 (KR) ........................ 10-2013-0024557

(51) Int. Cl.
*H04B 3/36* (2006.01)
*G08B 6/00* (2006.01)

(52) U.S. Cl.
CPC ........................................ *G08B 6/00* (2013.01)

(58) Field of Classification Search
CPC ........................................................ G08B 6/00
USPC ....................................................... 340/407.1
See application file for complete search history.

(56) References Cited

U.S. PATENT DOCUMENTS

| | | | | |
|---|---|---|---|---|
| 4,868,565 | A * | 9/1989 | Mettes et al. | 340/854.9 |
| 5,036,239 | A * | 7/1991 | Yamaguchi | 310/268 |
| 5,086,287 | A * | 2/1992 | Nutzel | 340/407.1 |
| 5,583,478 | A | 12/1996 | Renzi | |
| 5,718,588 | A * | 2/1998 | Tretiakoff et al. | 434/114 |
| 6,734,785 | B2 | 5/2004 | Petersen | |
| 6,979,164 | B2 * | 12/2005 | Kramer | 414/5 |
| 7,436,388 | B2 * | 10/2008 | Hillis et al. | 345/108 |
| 7,893,922 | B2 | 2/2011 | Klinghult et al. | |
| 8,602,786 | B2 * | 12/2013 | Takahashi et al. | 434/113 |
| 2009/0023116 | A1 | 1/2009 | Shaw | |
| 2013/0088341 | A1 * | 4/2013 | Lim et al. | 340/407.1 |

* cited by examiner

*Primary Examiner* — Kerri McNally
(74) *Attorney, Agent, or Firm* — NSIP Law

(57) ABSTRACT

A tactile sensation providing apparatus includes a tactile output unit configured to contact a part of a human body; a connection unit including a wire connected to the tactile output unit and made of a flexible and elastic material, and a tube enclosing the wire; and a driving unit to supply a driving force to the connection unit.

27 Claims, 6 Drawing Sheets

TACTILE SENSATION PROVIDING APPARATUS

CROSS-REFERENCE TO RELATED APPLICATIONS

This application claims the priority benefit of Korean Patent Application No. 10-2013-0024557, filed on Mar. 7, 2013, in the Korean Intellectual Property Office, the disclosure of which is incorporated herein by reference.

BACKGROUND

1. Field

The following description relates to a tactile sensation providing apparatus.

2. Description of the Related Art

A tactile sensation providing technology provides oscillation, force, heat, and the like to a user wearing a tactile sensation providing apparatus, thereby enabling the user to feel a corresponding tactile sensation.

SUMMARY

The foregoing and/or other aspects are achieved by providing a tactile sensation providing apparatus including a tactile output unit configured to contact a part of a human body; a connection unit including a wire connected to the tactile output unit and made of a flexible and elastic material, and a tube enclosing the wire; and a driving unit to supply a driving force to the connection unit.

The wire may include nickel (Ni) and titanium (Ti).

The tube may include Teflon.

The wire may include a plurality of wires.

Lubricant may be interposed between the wire and the tube.

The tactile output unit may include a body portion including a contact surface to contact with the part of the human body, and the contact surface may include a through hole for the wire to pass through.

The through hole may include a plurality of through holes arranged in parallel in a plurality of rows and a plurality of columns.

An end of the wire may be projectable out of the contact surface by driving the driving unit.

The end of the wire protruded out of the contact surface may be retractable into the body portion by driving the driving unit.

The tactile output unit may include a first frame to which the body portion is slidably mounted; and a second frame to which the first frame is slidably mounted, wherein the body portion may be guided by the first frame to move horizontally, and the first frame is guided by the second frame to move perpendicular to the movement of the body portion.

The connection unit may include a first connection portion connected to the through hole; a second connection portion connected to one side of the body portion to move the body portion horizontally; and a third connection unit connected to one side of the first frame to move the first frame perpendicular to the movement of the body portion.

The driving unit may push and pull the wire by linearly reciprocating or by rotating.

The driving unit may receive a signal from at least one of a virtual environment and a sensor and controls a movement of the wire according to the signal.

The foregoing and/or other aspects are achieved by providing a tactile sensation providing apparatus including a tactile output unit configured so that at least a part is movable; a driving unit configured to generate a driving force for moving the tactile output unit; and a connection unit configured to transmit the driving force of the driving unit to the tactile output unit and to include a wire made of a flexible and elastic material, and a tube enclosing the wire.

The wire may include nickel (Ni) and titanium (Ti).

The tube may include Teflon.

The wire may include a plurality of wires.

Lubricant may be interposed between the wire and the tube.

The tactile output unit may include a body portion including a contact surface to contact with the part of the human body; a first frame to which the body portion is slidably mounted; and a second frame to which the first frame is slidably mounted, wherein the body portion may be guided by the first frame to move horizontally, and the first frame is guided by the second frame to move perpendicular to the movement of the body portion.

The contact surface may include a through hole for the wire to pass through.

The through hole may include a plurality of through holes arranged in parallel in a plurality of rows and a plurality of columns.

An end of the wire may be projectable out of the contact surface by driving the driving unit.

The end of the wire may be retractable into the body portion by driving the driving unit.

The connection unit may include a first connection portion connected to the through hole; a second connection portion connected to connected to one side of the body portion to move the body portion horizontally; and a third connection unit connected to one side of the first frame to move the first frame perpendicular to the movement of the body portion.

The driving unit may push and pull the wire by linearly reciprocating or by rotating.

The driving unit may receive a signal from at least one of a virtual environment and a sensor and control a movement of the wire according to the signal.

The foregoing and/or other aspects are achieved by providing a method to provide a tactical sensation to a user, the method including transmitting a first force to a tactile output unit to project a wire from the tactile output unit in a first direction, transmitting a second force to the tactile output unit to move the wire in a second direction, and transmitting a third force to the tactile output unit to move the wire in a third direction.

The first direction may include movement along a z-axis, the second direction may include movement along an x-axis, and the third direction may include movement along a y-axis.

The movement in the first direction may provide a tactical sensation corresponding to a magnitude of stress along the z-axis, the movement in the second direction may provide a tactical sensation corresponding to a magnitude of stress along the x-axis, and the movement in the third direction may provide a tactical sensation corresponding to a magnitude of stress along the y-axis.

Additional aspects, features, and/or advantages of example embodiments will be set forth in part in the description which follows and, in part, will be apparent from the description, or may be learned by practice of the disclosure.

BRIEF DESCRIPTION OF THE DRAWINGS

These and/or other aspects and advantages will become apparent and more readily appreciated from the following description of the example embodiments, taken in conjunction with the accompanying drawings of which.

DETAILED DESCRIPTION

Figure 1:
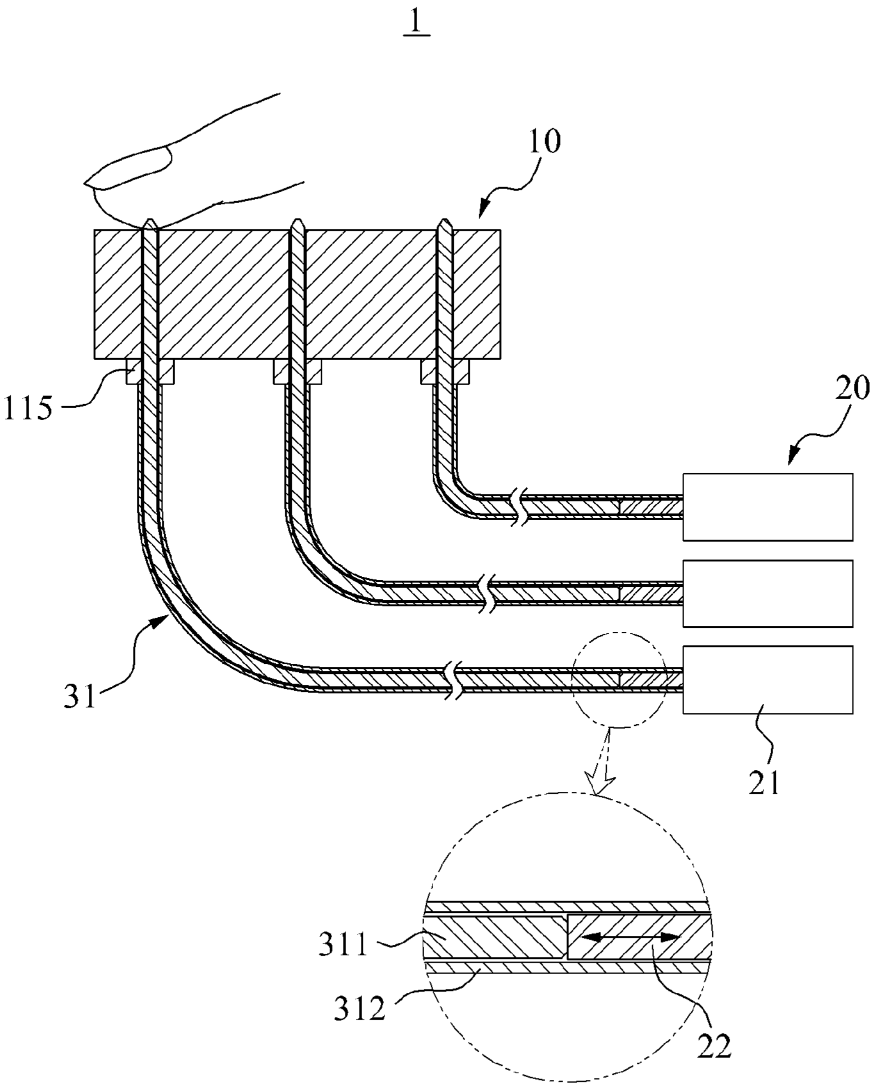
FIG. 1 illustrates a side view of a tactile sensation providing apparatus according to example embodiments.

Reference will now be made in detail to example embodiments, examples of which are illustrated in the accompanying drawings, wherein like reference numerals refer to the like elements throughout. Example embodiments are described below to explain the present disclosure by referring to the figures.

Figure 2:
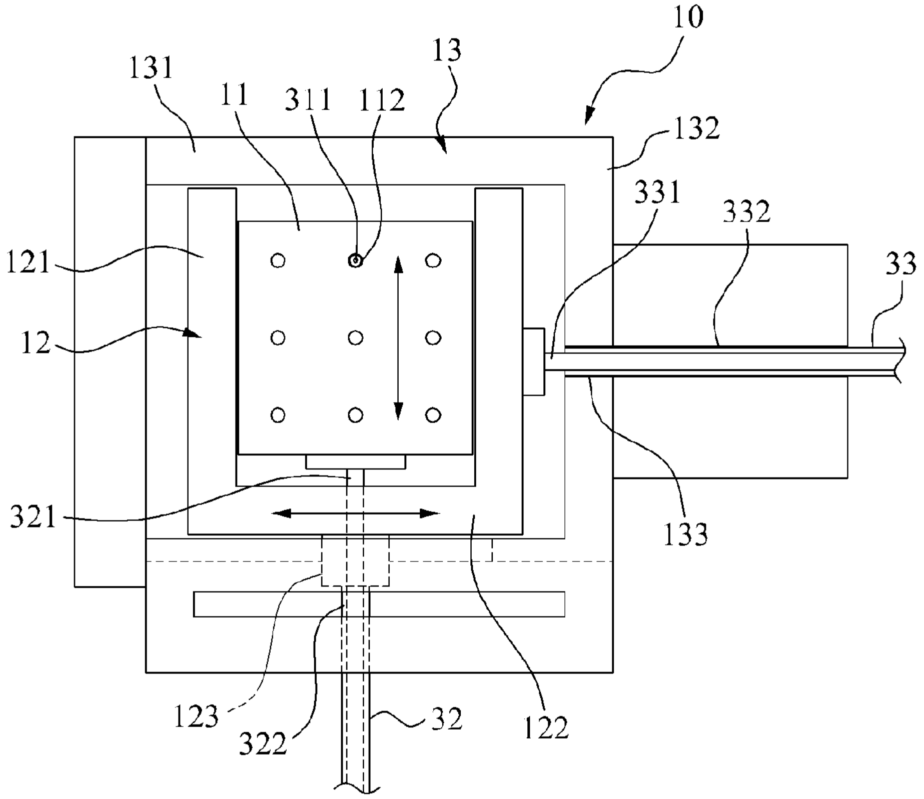
FIG. 2 illustrates a plan view showing main parts of a tactile sensation providing apparatus according to example embodiments.
Figure 3:
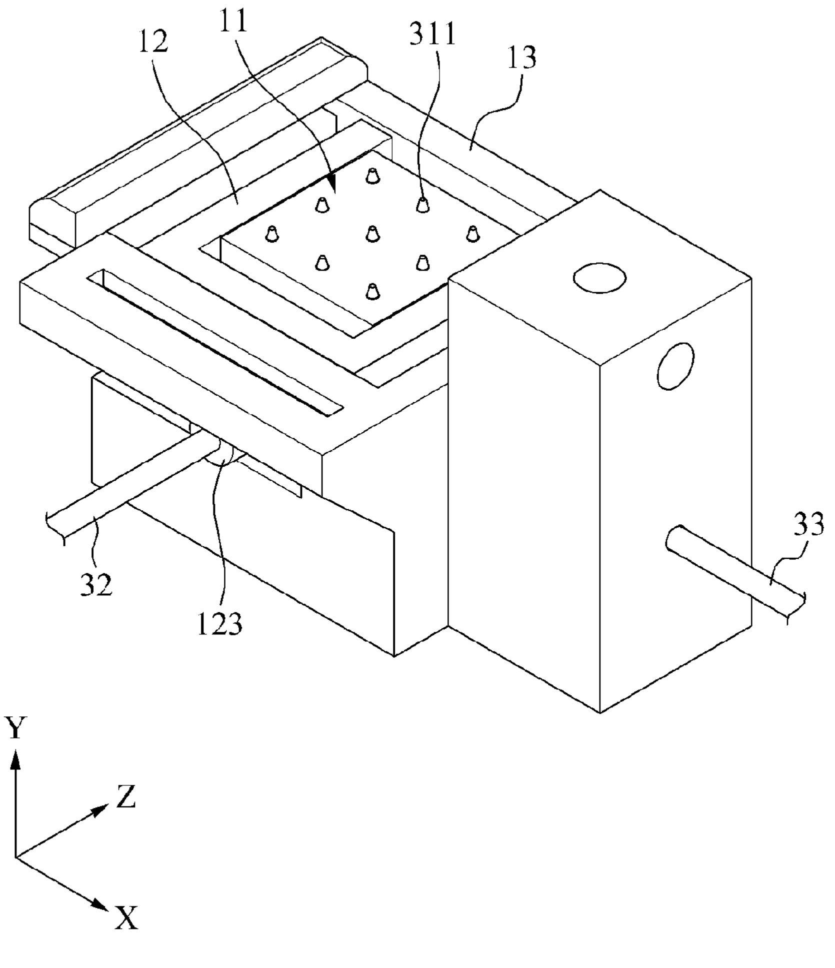
FIG. 3 illustrates a perspective view showing main parts of a tactile sensation providing apparatus according to example embodiments.

FIG. 1 illustrates a side view of a tactile sensation providing apparatus 1 according to example embodiments. FIG. 2 illustrates a plan view showing main parts of a tactile sensation providing apparatus according to example embodiments. FIG. 3 illustrates a perspective view showing main parts of a tactile sensation providing apparatus according to example embodiments.

Referring to FIGS. 1 to 3, the tactile sensation providing apparatus 1 may include a tactile output unit 10 configured to contact a part of a human body, connection units 31, 32, and 33 connected to the tactile output unit 10, and a driving unit 20 to move at least a part of the connection units 31, 32, and 33.

The tactile output unit 10 may include a body portion 11 including a contact surface to contact the part of the human body, a first frame 12 to which the body portion 11 is slidably mounted, and a second frame 13 to which the first frame 12 is slidably mounted. The connection units 31, 32, and 33 may include a first connection unit 31 connected to a bottom surface of the body portion 11, a second connection unit 32 connected to a side surface of the body portion 11 to move the body portion 11 horizontally, and a third connection unit 33 connected to a side surface of the first frame 12 to move the first frame 12 perpendicular to a movement of the body portion 11.

The connection units 31, 32, and 33 may be provided in a linearly elongated shape. The first connection unit 31 may include a first wire 311 made of a flexible and elastic material and a tube 312 enclosing the first wire 311. In the same manner as the first connection unit 31, the second connection unit 32 may include a second wire 321 made of a flexible and elastic material and a second tube 322 enclosing the second wire 321. In the same manner as the first connection unit 31, the third connection unit 33 may include a third wire 331 made of a flexible and elastic material and a third tube 332 enclosing the third wire 331.

The first wire to the third wire 311, 321, and 331 may be made of a flexible and elastic material. For example, the first wire to the third wire 311, 321, and 331 may include nickel (Ni)-titanium (Ti). Because the first wire to the third wire 311, 321, and 331 are flexible, the tactile output unit 10 may move with a user's finger. Because the driving unit 20 is separated from the tactile output unit 10, a size of the tactile output unit 10, which is to be worn on the user, may be minimized. However, the first wire 311 may have a certain degree of stiffness so that the finger contacting an upper end of the first wire 311 feels pushed when a lower end of the first wire 311 is pushed. In addition, the second wire 321 and the third wire 331 may have a certain degree of stiffness so that the body portion 11 and the first frame 12 contacting upper ends of the second wire 321 and the third wire 331 are pushed when lower ends of the second wire 321 and the third wire 331 are pushed. That is, the first wire to the third wire 311, 321, and 331 may be flexible and elastic in lateral directions while not deformed or compressed in lengthwise directions.

The first wire to the third wire 311, 321, and 331 and the first tube to the third tube 312, 322, and 333 may include a material having low friction, such as Teflon, for example. Lubricant may be interposed between the first tube to the third tube 312, 322, and 333 and the first wire to the third wire 311, 321, and 331, respectively, to reduce friction.

The driving unit 20 may include a body portion 21, and a wire connection unit 22 projected from the body portion 21. The wire connection unit 22 may be inserted in the first tube to the third tube 312, 322, and 332 and connected to ends of the first wire to the third wire 311, 321, and 331. The wire connection unit 22 may linearly reciprocate to move the first wire to the third wire 311, 321, and 331 back and forth in the lengthwise direction. The driving unit 20 may be a linear motor enabling the wire connection unit 22 to linearly reciprocate. Also, the driving unit 20 may be a rotation motor that rotates the wire connection unit 22 so that the first wire to the third wire 311, 321, and 331 are moved back and forth in the lengthwise direction by being wound and unwound on the wire connection unit 22. The driving unit 20 may be provided corresponding to the first wire to the third wire 311, 321, and 331, respectively.

The body portion 11 may be in a hexahedral shape. An upper surface of the body portion 11 may include the contact surface for contact with a human body, such as a finger, for example. The contact surface of the body portion 11 may include a plurality of through holes 112. The through holes 112 may pass through the body portion 11 perpendicularly, extending from the upper surface to a lower surface of the body portion 11. The through holes 112 may be arranged in parallel in a plurality of rows and a plurality of columns. For example, the through holes 112 may be in an arrangement of 3 rows×3 columns, 4 rows×4 columns, or 6 rows×6 columns. Furthermore, the number of rows may not be equal to the number of columns, such as an arrangement of 3 rows×4 columns or 5 rows×3 columns, for example.

The first wire 311 of the first connection unit 31 may be passed through a lower portion of the through holes 112 and inserted in the body portion 11. A lower portion of the body portion 11 may include an insertion portion 115 guiding insertion of the first connection unit 31 into the body portion 11. The insertion portion 115 may be provided in a cylindrical shape extending to a lower portion of the bottom surface of the body portion 11 and may enclose an outer circumference of at least a part of the first connection unit 31.

The upper end of the first wire 311 may be projected out of the contact surface of the body portion 11 by driving the driving unit 20. When the upper end of the first wire 311 is projected out of the contact surface of the body portion 11 with a human body part, such as a finger, contacting the contact surface of the body portion 11, the user may feel a tactile sensation. When the upper end of the first wire 311 is projected out of the contact surface of the body portion 11, the user may perceive a force vertically pressing the finger, that is, a normal stress. When a sensor or a virtual environment connected to the driving unit 20 detects the normal stress, the sensor may command the driving unit 20 to push up the first wire 311 by a same degree as the normal stress. The upper end of the first wire 311 projected out of the contact surface of the body portion 11 may be retracted into the body portion 11 by driving the driving unit 20.

The first frame 12 may be formed in a flattened-U shape or a rectangular shape adapted to enclose a side surface of the body portion 11. The body portion 11 may be configured to contact an inner circumference of the first body portion 12 and move in a horizontal direction, that is, a first direction. The first frame 12 may include body guide portions 121 to guide a movement of the body portion 11 and a guide connection portion 122 to interconnect the body guide portions 121. The body guide portions 121 may be a pair of smooth plates facing each other at a predetermined distance from each other. The guide connection unit 122 may include a first frame through hole 123 for the second wire 321 of the second connection unit 32 to pass through. The second wire 321 may be passed through the first frame through hole 123 and connected to the side surface of the body portion 11. The second wire 321 may be moved back and forth by the driving unit 20. The body portion 11 connected to the second wire 321 may be interposed between the body guide portions 121 and moved back and forth in the horizontal direction which is the first direction, that is, in a direction in which the body guide portions 121 extend. A sufficient space may be provided at an inside of the first frame 12, that is, a front and a back of the body portion 11, so that the body portion 11 may freely move.

The second frame 13 may be formed in a flattened-U shape or a rectangular shape adapted to enclose a side surface of the first frame 12. The first frame 12 may be configured to contact an inner circumference of the second frame 13 and move in a horizontal direction, that is, a second direction. The second frame 13 may include frame guide portions 131 to guide a movement of the first frame 12 and a guide connection portion 132 to interconnect the frame guide portions 131. The frame guide portions 131 may be a pair of smooth plates facing each other at a predetermined distance from each other. The frame guide portions 131 may extend perpendicular to a direction in which the body guide portions 121 extend. Accordingly, a movement direction of the body portion 11, that is, the first direction, may be perpendicular to a movement direction of the first frame 12, that is, the second direction. The guide connection portion 132 may include a second frame through hole 133 for the third wire 331 of the third connection portion 33 to pass through. The third wire 331 may be passed through the second frame through hole 133 and connected to the side surface of the first frame 12, that is, the body guide portion 121. The third wire 331 may be moved back and forth by the driving unit 20. The first frame 12 connected to the third wire 331 may be inserted in a space between the frame guide portions 131 and moved back and forth in a horizontal direction, that is, the second direction in which the frame guide portions 131 extend. A sufficient space may be provided at an inside of the second frame 13, that is, a front and a back of the first frame 12, so that the first frame 12 may freely move. As the first frame 12 moves back and forth horizontally in the second direction, with the body portion 11 closely contacting the inside of the first frame 12, the body portion 11 may be accordingly moved back and forth horizontally in the second direction. The body portion 11 may be moved back and forth horizontally in the first direction according to a linear movement of the second wire 321. Also, the body portion 11 may be moved back and forth horizontally in the second direction, perpendicularly to the first direction, according to a linear movement of the third wire 331. As the body portion 11 linearly moves in the first direction or in the second direction perpendicular to the first direction, for example, the finger of the user put on the contact surface of the body portion 11 may perceive a shear stress. When the shear stress is detected by the sensor or the virtual environment connected to the driving portion 20, the sensor may instruct the driving portion 20 to push up the second wire 321 and the third wire 331 by a same degree as the shear stress.

Figure 4:
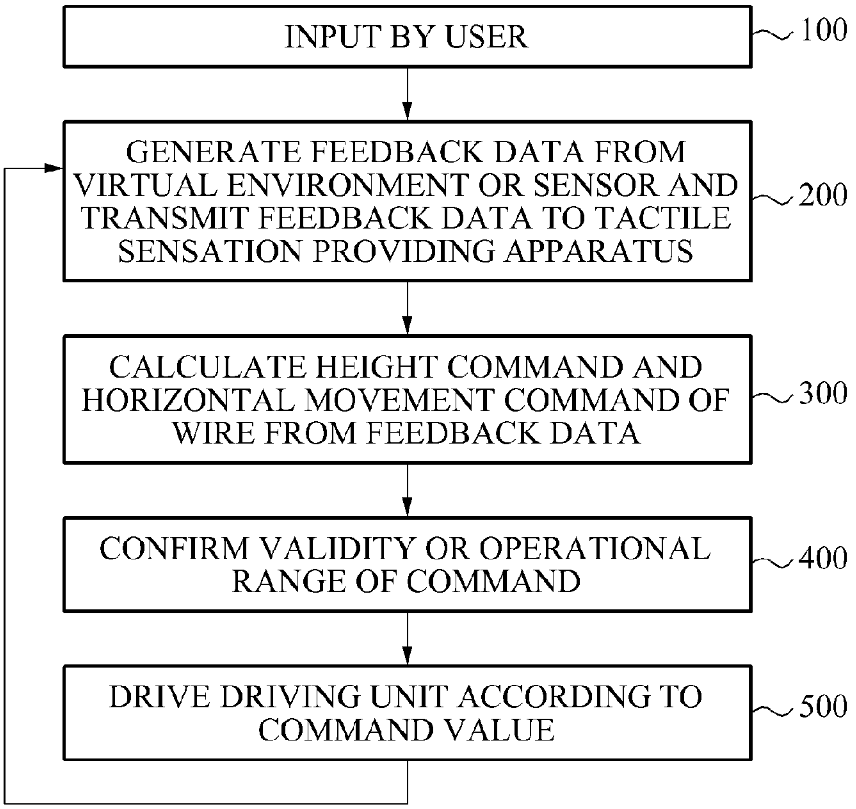
FIG. 4 illustrates a block diagram of a system including a tactile sensation providing apparatus according to example embodiments.
Figure 5:
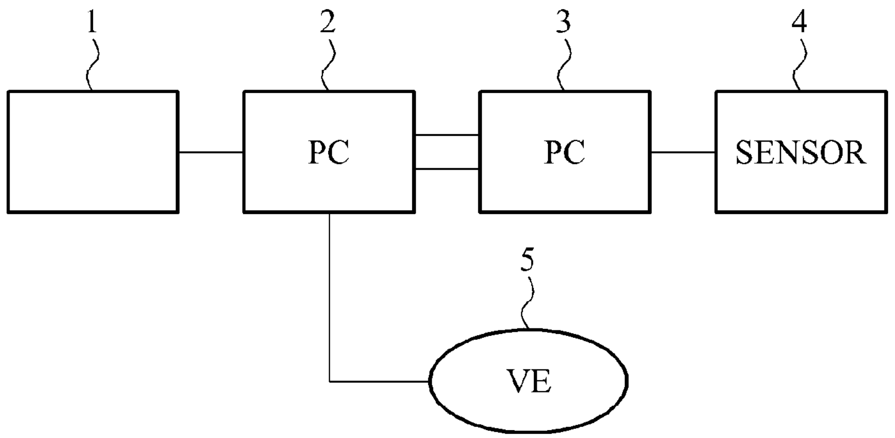
FIG. 5 illustrates a flow chart of an operational process of a tactile sensation providing apparatus according to example embodiments.

FIG. 4 illustrates a block diagram of a system including a tactile sensation providing apparatus 1 according to example embodiments. FIG. 5 illustrates a flow chart of an operational process of a tactile sensation providing apparatus 1 according to example embodiments.

Referring to FIGS. 4 and 5, the tactile sensation providing apparatus 1 may be connected to a first computer 2. The first computer 2 may receive tactile information from a virtual environment 5 or from a second computer 3 connected to a tactile sensor 4.

The operational process of the tactile sensation providing apparatus 1 will be described. In operation 100, a user input may be generated at the tactile sensor 4 or the virtual environment 5. For example, the input may be generated when the user drives an input device in the virtual environment 5. Also, the input may be generated at the tactile sensor 4 mounted to a slave robot when a master operated by the user in a master-slave system moves a slave system.

In operation 200, feedback data may be generated from the virtual environment 5 or the tactile sensor 4 and the feedback data may be transmitted to the tactile sensation providing apparatus 1. In operation 300, when the tactile sensation providing apparatus 1 receives the feedback data, a control portion of the tactile sensation providing apparatus 1 may calculate a height command value related to a height by which the first wire 311 is to be protruded out of the contact surface of the body portion 11 and calculate a horizontal movement command value related to a distance by which the third wire 331 is to be moved horizontally, and accordingly the body portion 11 is to be moved horizontally.

In operation 400, the control portion of the tactile sensation providing apparatus 1 may determine a validity of the height command value and the horizontal movement command value. A range of the validity may be determined to prevent parts of the tactile sensation providing apparatus 1, such as the first wire to the third wire 311, 321, and 331, from being broken and to secure safety of the user.

In operation 500, when the height command value and the horizontal movement command value are within the valid range, the control portion may command the driving portion 20 so that the first wire to the third wire 311, 321, and 331 may move according to the height command value and the horizontal movement command value.

For example, when the tactile sensor 4 detects a vertical stress, the driving portion 20 may push the first wire 311 disposed in a position in which the vertical stress is detected by the tactile sensor 4, so that the first wire 311 protrudes out of the contact surface of the body portion 11. In addition, the driving portion 20 may apply a stress of a same degree as the vertical stress detected by the tactile sensor 4 to a body part, such as the finger, contacting the contact surface so that the first wire 311 protrudes out of the contact surface.

When the tactile sensor 4 detects the shear stress, the driving portion 20 may push the second wire 321 or the third wire 311 by a stress of a same degree as the shear stress detected by the tactile sensor 4 by the body part such as the finger, so that the body portion 11 is horizontally moved.

Figure 6:
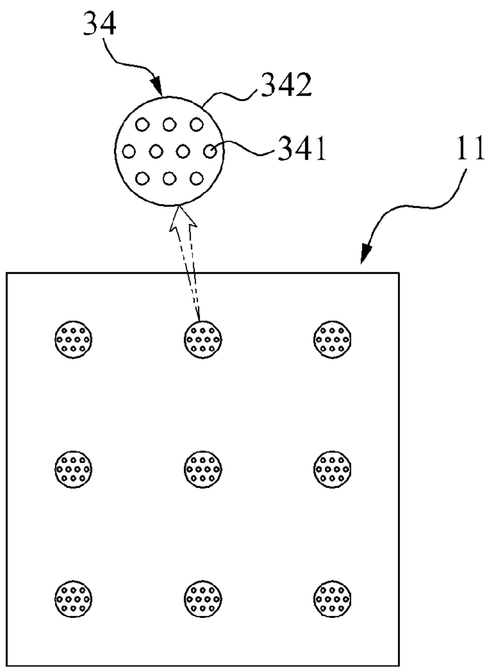
FIG. 6 illustrates a cross sectional view of a wire and a plan view of a body portion of a tactile sensation providing apparatus according to example embodiments.

FIG. 6 illustrates a cross sectional view of a wire and a plan view of a body portion 11 of a tactile sensation providing apparatus according to example embodiments.

Referring to FIG. 6, a first connection portion 34 includes a plurality of first wires 341 and a tube 342 enclosing the plurality of first wires 341. Because the plurality of first wires 341 are provided to the first connection unit 34, a position to which the vertical stress is applied may be transmitted to the user more accurately during transmission of the vertical stress. In addition, because the plurality of wires 341 are provided to the first connection portion 34, an upper limit of the vertical stress that may be transmitted to the user may be increased in comparison to when a single wire is provided.

The tactile sensation providing technology for transmitting oscillation and force to a user and enable the user to perceive a tactile sensation may be applied to deliver a tactile sensation virtually generated through connection with a virtual environment to the user or to deliver a tactile sensation perceived by a medical robot to a doctor. Although example embodiments have been shown and described, it would be appreciated by those skilled in the art that changes may be made in these example embodiments without departing from the principles and spirit of the disclosure, the scope of which is defined in the claims and their equivalents.

Accordingly, other implementations are within the scope of the following claims.

The above-described embodiments may be recorded in computer-readable media including program instructions to implement various operations embodied by a computer. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. The computer-readable media may also be a distributed network, so that the program instructions are stored and executed in a distributed fashion. The program instructions may be executed by one or more processors. The computer-readable media may also be embodied in at least one application specific integrated circuit (ASIC) or Field Programmable Gate Array (FPGA), which executes (processes like a processor) program instructions. Examples of program instructions include both machine code, such as produced by a compiler, and files containing higher level code that may be executed by the computer using an interpreter. The above-described devices may be configured to act as one or more software modules in order to perform the operations of the above-described embodiments, or vice versa.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A tactile sensation providing apparatus comprising:

a tactile output unit comprising a contact surface to contact a part of a human body, wherein the tactile output unit further comprising a body portion comprising the contact surface and the tactile output unit further comprises a first frame to which the body portion is slidably mounted and which guides the body portion to move horizontally;

a connection unit comprising a wire connected to the tactile output unit, and a tube enclosing the wire; and a driver configured to supply a driving force to the connection unit.

2. The tactile sensation providing apparatus of claim 1, wherein the wire comprises nickel (Ni) and titanium (Ti).

3. The tactile sensation providing apparatus of claim 1, wherein the tube comprises Teflon.

4. The tactile sensation providing apparatus of claim 1, wherein the wire comprises a plurality of wires.

5. The tactile sensation providing apparatus of claim 1, wherein lubricant is interposed between the wire and the tube.

6. The tactile sensation providing apparatus of claim 1, wherein the contact surface comprises a through hole for the wire to pass through.

7. The tactile sensation providing apparatus of claim 6, wherein the through hole comprises a plurality of through holes arranged in a plurality of rows and a plurality of columns.

8. The tactile sensation providing apparatus of claim 6, wherein an end of the wire is projectable out of the contact surface by driving the driver.

9. The tactile sensation providing apparatus of claim 8, wherein the end of the wire protruded out of the contact surface is retractable into the body portion by driving the driver.

10. The tactile sensation providing apparatus of claim 1, wherein the tactile output unit further comprises:

a second frame to which the first frame is slidably mounted and which guides the second frame to move perpendicular to the movement of the body portion.

11. The tactile sensation providing apparatus of claim 10, wherein the connection unit comprises:

a first connection portion connected to the through hole;

a second connection portion connected to one side of the body portion to move the body portion horizontally; and a third connection portion connected to one side of the first frame to move the first frame perpendicular to the movement of the body portion.

12. The tactile sensation providing apparatus of claim 1, wherein the driver pushes and pulls the wire by linearly reciprocating or by rotating.

13. The tactile sensation providing apparatus of claim 1, wherein the driver receives a signal from at least one of a virtual environment and a sensor and controls a movement of the wire according to the signal.

14. A tactile sensation providing apparatus comprising:

a tactile output unit comprising a movable part, wherein the tactile output unit further comprises a body portion comprising a contact surface to contact with a part of a human body, and a first frame to which the body portion is slidably mounted, wherein the body portion is guided by the first frame to move horizontally;

a driver configured to generate a driving force for moving the movable part of the tactile output unit; and a connection unit configured to transmit the driving force of the driver to the tactile output unit and comprising a wire, and a tube enclosing the wire.

15. The tactile sensation providing apparatus of claim 14, wherein the wire comprises a plurality of wires.

16. The tactile sensation providing apparatus of claim 14, wherein the tactile output unit further comprises a second frame to which the first frame is slidably mounted, wherein the first frame is guided by the second frame to move perpendicular to the movement of the body portion.

17. The tactile sensation providing apparatus of claim 16, wherein the contact surface comprises a through hole for the wire to pass through.

18. The tactile sensation providing apparatus of claim 17, wherein the through hole comprises a plurality of through holes arranged in parallel in a plurality of rows and a plurality of columns.

19. The tactile sensation providing apparatus of claim 16, wherein an end of the wire is projectable out of the contact surface by driving the driver.

20. The tactile sensation providing apparatus of claim 19, wherein the end of the wire is retractable into the body portion by driving the driver.

21. The tactile sensation providing apparatus of claim 17, wherein the connection unit comprises:

a first connection portion connected to the through hole;

a second connection portion connected to one side of the body portion to move the body portion horizontally; and a third connection portion connected to one side of the first frame to move the first frame perpendicular to the movement of the body portion.

22. The tactile sensation providing apparatus of claim 14, wherein the driver pushes and pulls the wire by linearly reciprocating or by rotating.

23. The tactile sensation providing apparatus of claim 14, wherein the driver receives a signal from at least one of a virtual environment and a sensor, and controls a movement of the wire according to the signal.

24. A method to provide a tactical sensation to a user, the method comprising:

transmitting a first force to a tactile output unit to project a wire from the tactile output unit in a first direction, transmitting a second force to the tactile output unit to move the wire in a second direction wherein the first direction comprises movement along a z-axis, and the second direction comprises movement along an x-axis, wherein the tactile output unit further comprises a body portion comprising a contact surface to contact with a part of a human body, and a first frame to which the body portion is slidably mounted, wherein the body portion is guided by the first frame to move in the second direction.

25. The method of claim 24, further comprising:

transmitting a third force to the tactile output unit to move the wire in a third direction, wherein the third direction comprises movement along a y-axis.

26. The method of claim 25, wherein the movement in the first direction provides a tactical sensation corresponding to a magnitude of stress along the z-axis, the movement in the second direction provides a tactical sensation corresponding to a magnitude of stress along the x-axis, and the movement in the third direction provides a tactical sensation corresponding to a magnitude of stress along the y-axis.

27. The method of claim 24, wherein the transmitting the second force to the tactile output unit to move the wire in the second direction occurs while the wire is projecting from the tactile output unit.

* * * * *